(12) United States Patent
DiGonis

(10) Patent No.: US 7,558,666 B2
(45) Date of Patent: Jul. 7, 2009

(54) IDLE STOP SYSTEM

(76) Inventor: Michael DiGonis, P.O. Box 202, City Island, NY (US) 10464

( * ) Notice: Subject to any disclaimer, the term of this patent is extended or adjusted under 35 U.S.C. 154(b) by 0 days.

(21) Appl. No.: 12/032,891

(22) Filed: Feb. 18, 2008

(65) Prior Publication Data

US 2008/0201064 A1    Aug. 21, 2008

Related U.S. Application Data

(60) Provisional application No. 60/890,541, filed on Feb. 19, 2007.

(51) Int. Cl.
*G06F 19/00* (2006.01)
*G06F 7/00* (2006.01)
*B60W 10/04* (2006.01)

(52) U.S. Cl. ..................... 701/112; 477/203
(58) Field of Classification Search ............... 701/112; 477/203–206; 123/179.4, 179.2
See application file for complete search history.

(56) References Cited

U.S. PATENT DOCUMENTS

| | | | |
|---|---|---|---|
| 6,267,706 B1 | 7/2001 | Kuroda et al. | |
| 6,307,277 B1 | 10/2001 | Tamai et al. | |
| 6,308,129 B1 * | 10/2001 | Uchida | 701/112 |
| 6,482,127 B2 | 11/2002 | Katou | |
| 6,504,259 B1 | 1/2003 | Kuroda et al. | |
| 6,702,718 B2 | 3/2004 | Tani et al. | |
| 6,817,329 B2 | 11/2004 | Buglione et al. | |
| 6,865,451 B2 * | 3/2005 | Onoyama et al. | 701/112 |
| 2002/0086772 A1 | 7/2002 | Abe et al. | |
| 2006/0142121 A1 | 6/2006 | Moriya | |

FOREIGN PATENT DOCUMENTS

JP    2006-112400 A  *  4/2006

* cited by examiner

*Primary Examiner*—Hieu T Vo
(74) *Attorney, Agent, or Firm*—Aziz M. Ahsan; Ahsan & Associates, PLLC

(57) ABSTRACT

An idle stop controller connects to a vehicle computer so as to implement an idle stop on request of the driver from a signal derived from a foot brake, a parking brake, or a voice-activated switch. It also implements an engine restart on request of the driver, and this can be done in several ways.

12 Claims, 9 Drawing Sheets

IDLE STOP SYSTEM

REFERENCE TO RELATED APPLICATIONS

This application claims one or more inventions which were disclosed in Provisional Application No. 60/890,541, filed 19 Feb. 2007, entitled "Idle Stop System". The benefit under 35 USC § 119(e) of the United States provisional application is hereby claimed, and the aforementioned application is incorporated herein by reference.

TECHNICAL FIELD

Automotive idle stop technology.

BACKGROUND

Several patents, including U.S. Pat. Nos. 6,267,706 (Kuroda et al.), 6,307,277 (Tamai et al.), 6,482,127 (Katou), 6,504,259 (Kuroda et al.), 6,532,926 (Kuroda et al.), 6,702,718 (Tani et al.), 6,817,329 (Buglione et al.) and publications Nos. 2002/0086772 (Abe et al.), and 2006/0142121 (Moriya) suggest stopping an idle of a motor vehicle to conserve fuel when engine power is not needed to move the vehicle. Idle stop systems are often used in vehicles known as hybrids, and it is generally established that stopping an unnecessary idle of an internal combustion engine can save fuel, especially for a vehicle that is driven in an urban environment where stops are made necessary by traffic signals and traffic jambs. Delivery vehicles can also advantageously use an idle stop during brief stops made for delivery purposes.

This invention aims at a simpler and more affordable way of implementing an idle stop in a motor vehicle. By making an idle stop system sufficiently low cost and easy to operate, the invention allows an idle stop to be applied to many types of vehicles powered by internal combustion engines, whether in a form known as hybrid or not.

SUMMARY

The invention uses an idle stop controller connected with a vehicle computer, which in turn is connected to vehicle components. Such an arrangement is similar to car alarm systems that are also connected to a vehicle computer in known and inexpensive ways in which they are able to remotely start the engine. Working via the vehicle computer, the idle stop controller stops an engine idle when a driver signals for such a stop. This can be done by pressing slightly harder on the brake pedal than is necessary to hold the vehicle in a stopped position. It can also be done by setting a hand brake, which is especially suitable for delivery vehicles, or operating a voice-activated switch. The driver conversely signals for a vehicle start by releasing the brake pedal, releasing the hand brake, or operating the voice activated switch. Preferably the vehicle computer is involved in these signals so that the idle stop controller implements an idle stop only when the vehicle is motionless and the engine is warm, and conversely implements an engine restart only when the driver's seat is occupied.

The engine idle stop can be accomplished in at least two ways. One is by shutting off an electric ignition system for the engine, and another is shutting off a fuel pump feeding fuel to the engine. A restart of the engine can also be accomplished in several ways. One is by switching on a turned off electric ignition or a turned off fuel pump while actuating an electric starter. Another involves the same steps except for using a hydraulic starter instead of an electric starter. Such a hydraulic starter can be powered by a hydraulic accumulator that is supplied with stored energy from a moving engine component. Restarting can also be accomplished by a motor generator rotationally connected to the engine and electrically connected to a battery to serve as a separate restarting motor. With such an arrangement, battery power can be delivered to the engine via the motor generator to assist the engine in accelerating the vehicle into motion. A spark start is also possible by delivering a spark to a cylinder in a power stroke position.

A hydraulic accumulator can also be arranged to operate an air conditioner compressor to allow a vehicle air conditioner to operate during an idle stop. There are several ways that energy can be stored in a hydraulic accumulator, and these include using a hydraulic steering pump or using a hydraulic pump otherwise powered by an engine.

DRAWINGS

Figure 5:
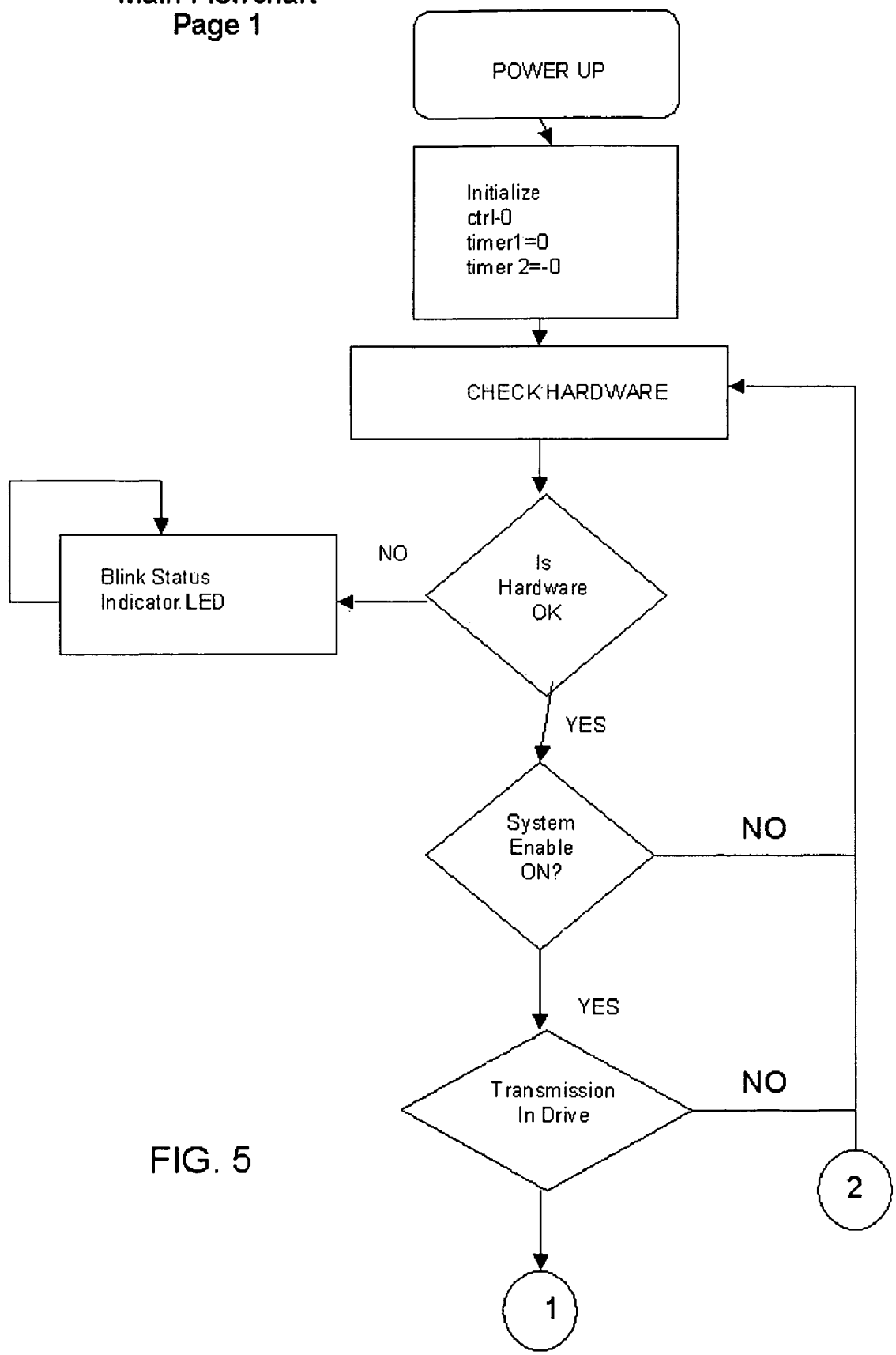
Figure 6:
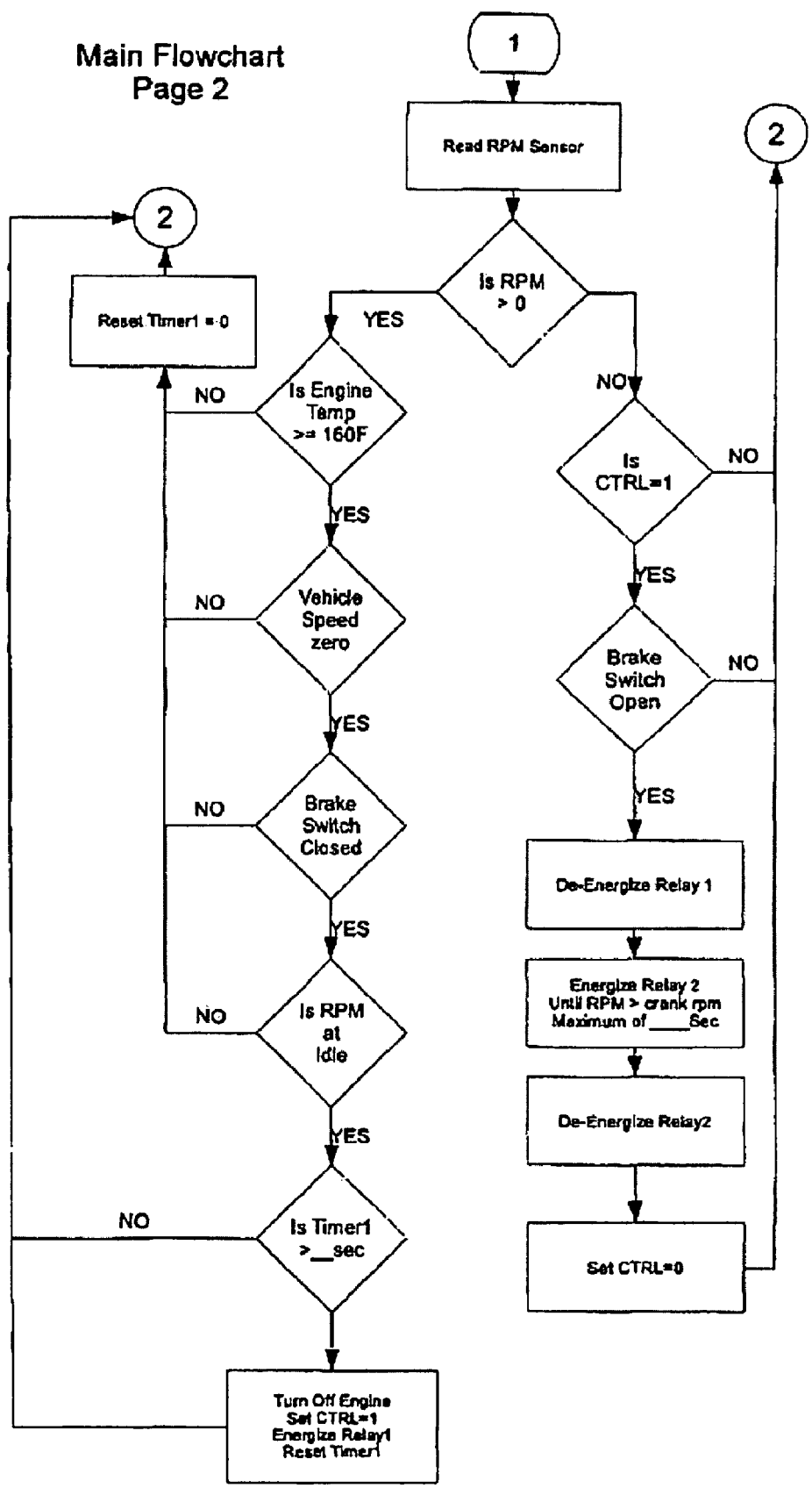

FIGS. 5 and 6 respectively show first and second pages of a flow chart for a preferred embodiment of an idle stop device.

Figure 7:
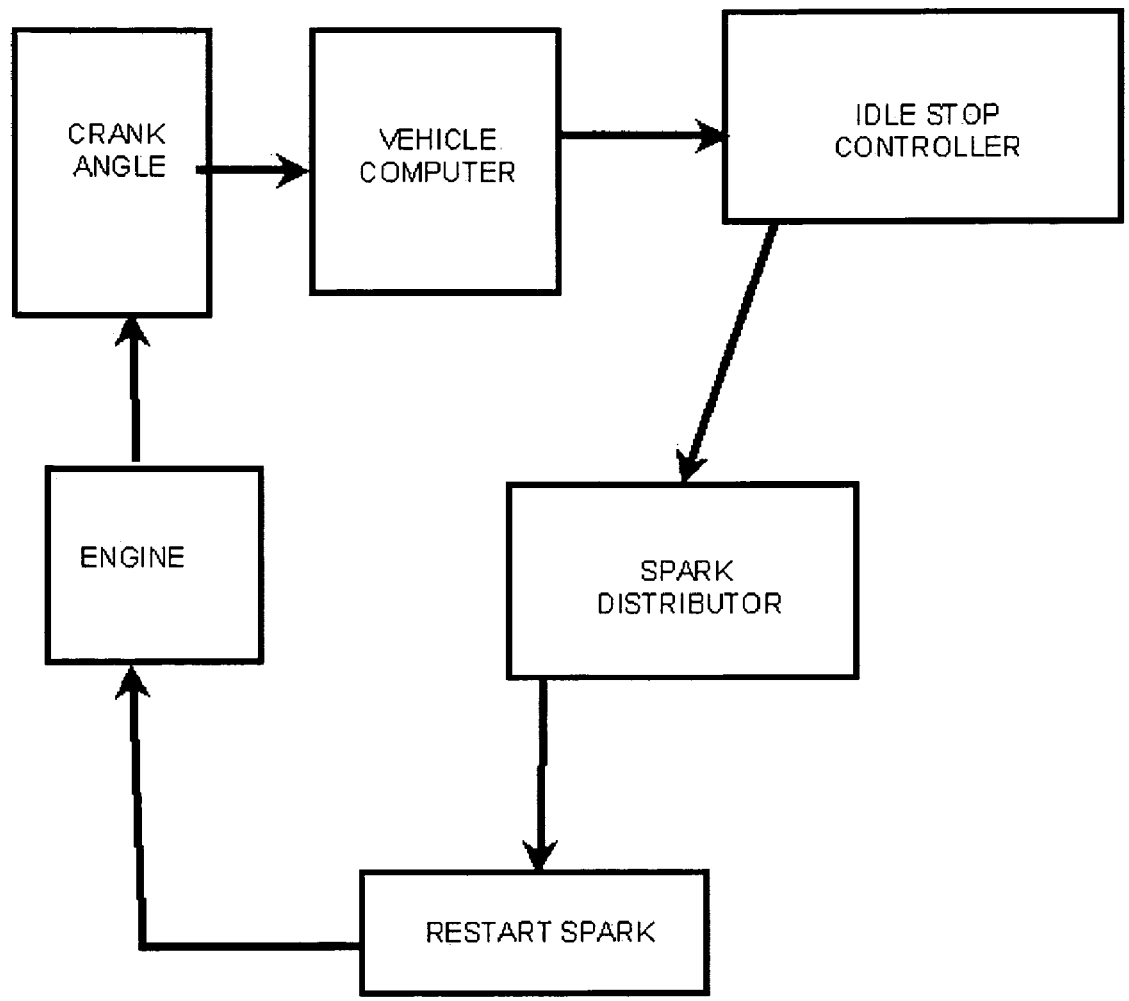

FIG. 7 is a schematic diagram of an alternative engine restart system using a spark directed to a cylinder in a power stroke position.

Figure 8:
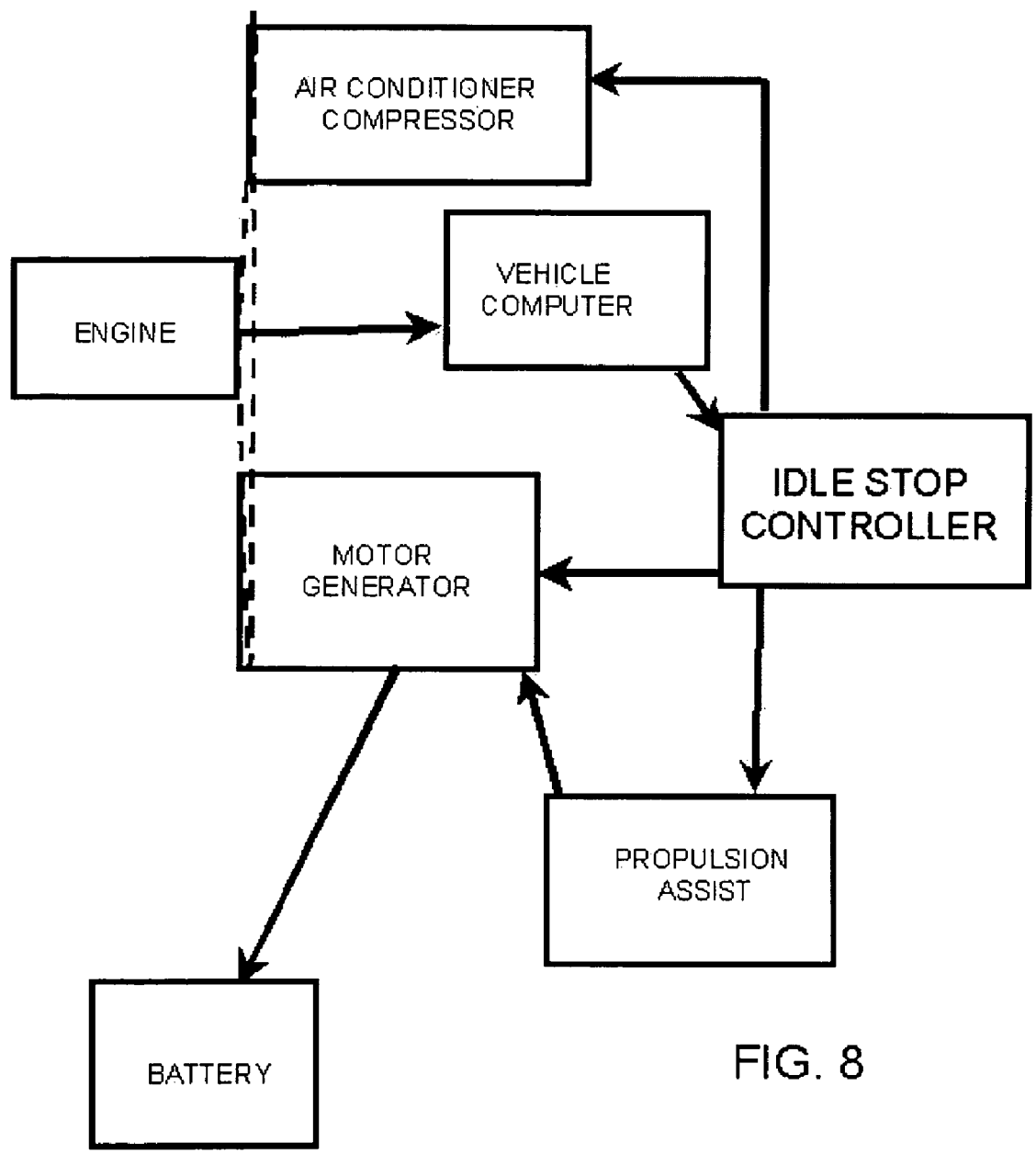

FIG. 8 is a schematic diagram of a separate motor generator restart system belted to an engine to accommodate an air conditioner during an idle stop and to give a propulsion assist to an engine getting a vehicle moving after an idle stop.

Figure 9:
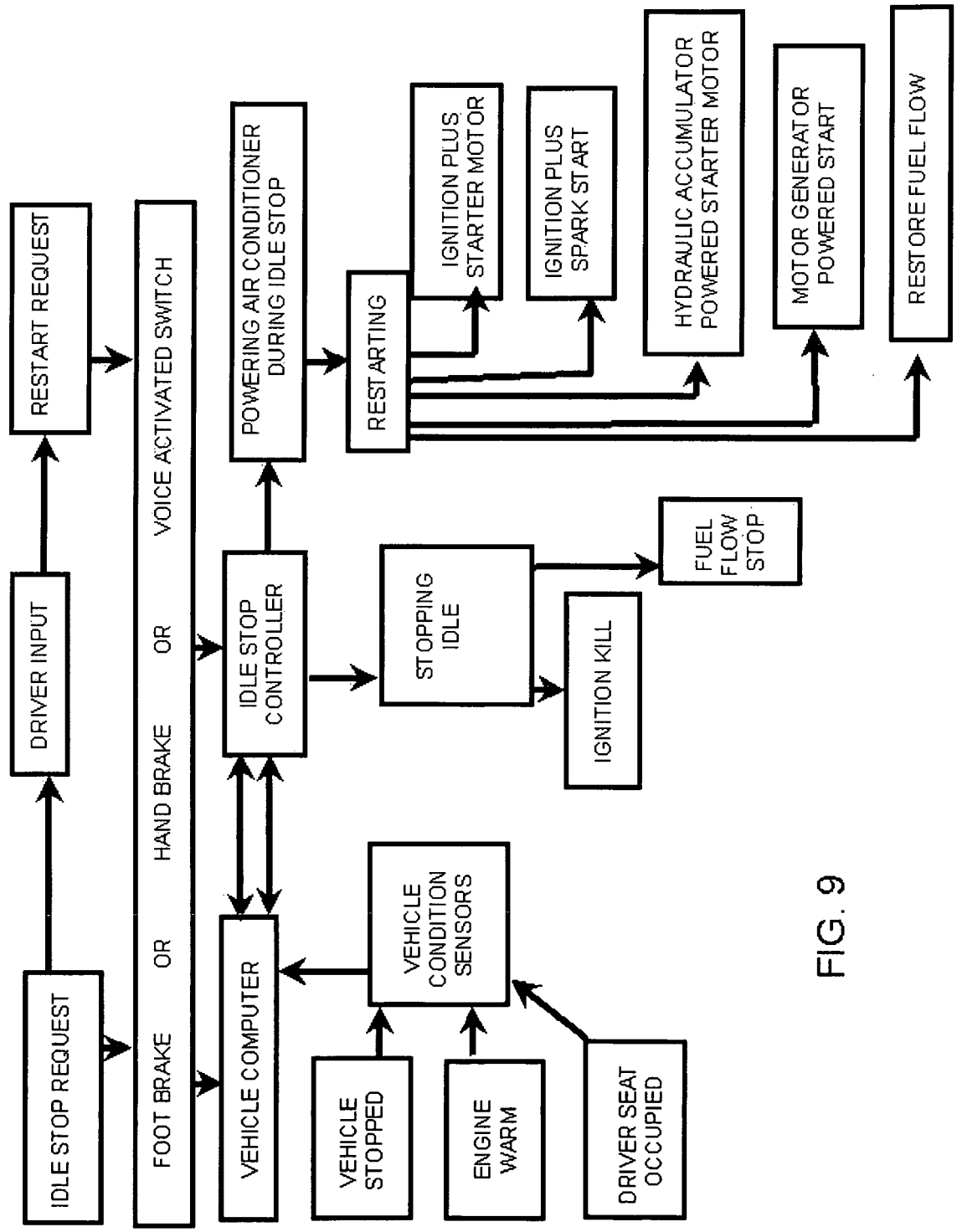

FIG. 9 is a schematic diagram showing several preferred alternatives for implementing idle stops and restarts.

DETAILED DESCRIPTION

Figure 1:
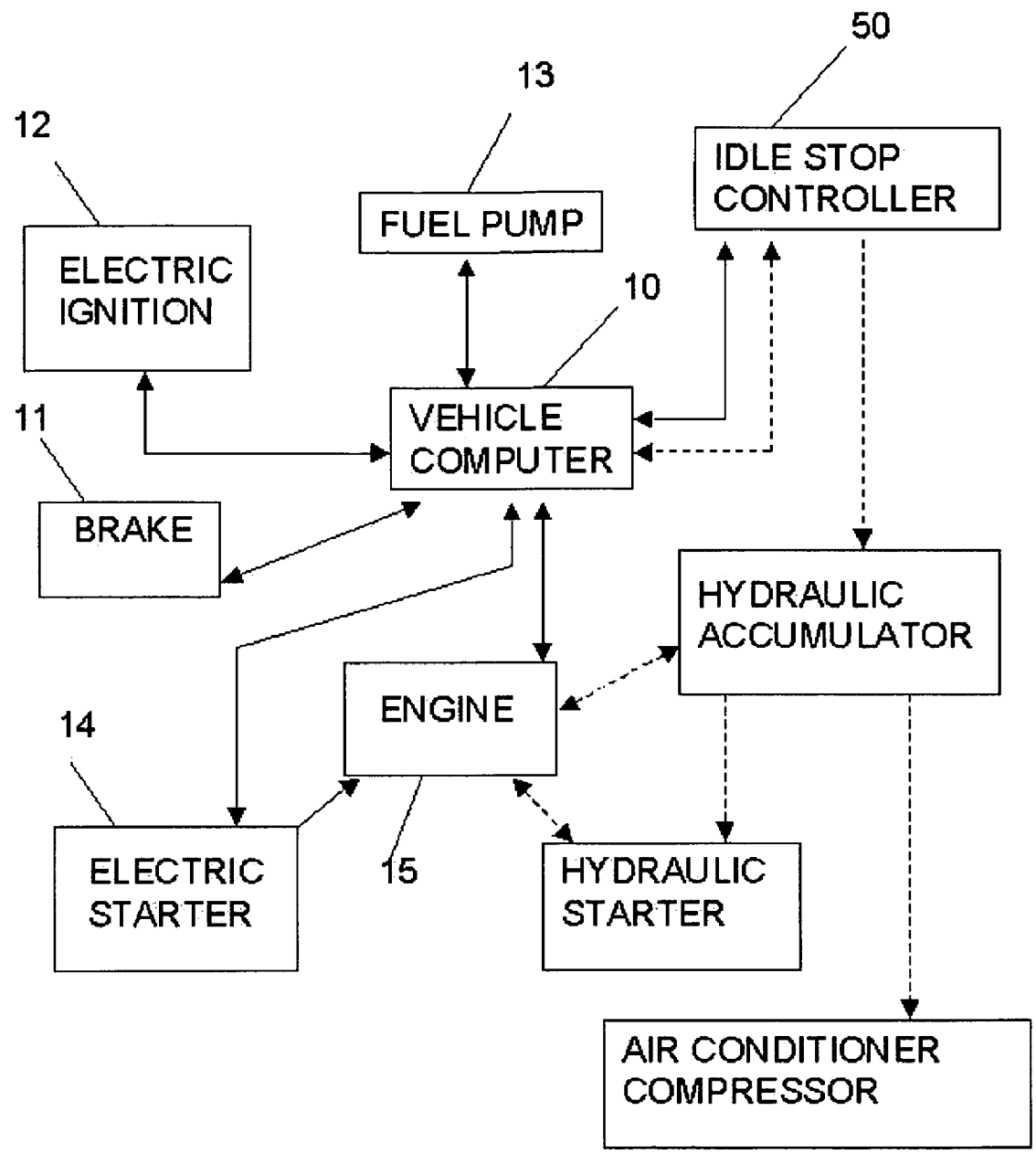
FIG. 1 is a schematic flow diagram of components arranged in the inventive idle stop system and with alternative components shown in broken lines.

Referring to FIG. 1, Idle stop controller 50 is preferably formed as an electronic package interconnected with vehicle computer 10 in the same sort of way that a car alarm system with a remote start capability is presently connected to a vehicle computer. Idle stop controller 50 can use some of the same technology that is involved in a remote start feature of a car alarm wired into a vehicle computer 10, but additional arrangements are made, as described below to accomplish idle stop functions. With the aid of controller 50, an idle stop can then be accomplished for many internal combustion engine vehicles, whether hybrid or not. Studies have found that stopping an unnecessary idle of an internal combustion engine in a vehicle can save a significant percentage of the vehicle's fuel consumption, especially if the vehicle is driven in an urban environment.

One signal for stopping an engine idle and restarting an engine is preferably derived from foot brake 11. Signal paths from computer 10 and brake 11 already exist in many vehicles, but signals from brake 11 can alternatively be passed directly to idle stop controller 50. The signal to stop an engine idle is preferably accomplished by a driver by pressing harder on brake 11 than is necessary to stop or hold a vehicle motionless. The increased brake pressure, which is preferably sensed by computer 10 and idle stop controller 50 is used to stop engine 15. This is preferably done only when computer 10 indicates that the vehicle is motionless and the engine is warm.

Since an idle stop signal is under control of a driver, engine 15 can avoid unnecessary or unwanted stops. A driver can use judgment involving the traffic situation that the vehicle faces in deciding whether to initiate an idle stop. At the same time, driver actions required to initiate an engine stop are simple enough to be nearly automatic. They involve variations on things a driver would do anyway, such as holding brake pressure during a vehicle stop, setting a hand brake when briefly leaving a delivery vehicle or issuing a voice command to a voice activated switch.

A driver also initiates a restart of the engine, and preferably does this simply by releasing the excess pressure on brake 11, releasing a hand brake, or uttering a voice command to a voice actuated switch.

When the brake release signal is detected by controller 50, it initiates an engine restarting sequence that makes engine power available as quickly as a driver can press an accelerator.

One preferred way of stopping an engine idle is by killing an electric ignition switch 12. Ignition switching is generally within the control of vehicle computer 10 and can be actuated in response to commands from controller 50.

Another way of shutting off an internal combustion engine to accomplish an idle stop is by switching off fuel pump 13. This can stop a diesel engine that lacks an ignition system, but it can also stop an ignition based engine.

Restarting an engine can be accomplished by an electric starter 14 that serves as the basic starter of engine 15. Fuel pump 13, and electric starter 14, are generally in electrical communication with vehicle computer 10, and thereby subject to orders from idle stop controller 50.

Alternative arrangements shown in broken lines in FIG. 1 relate to hydraulic accumulator 20, which can store hydraulic energy delivered by a hydraulic pump powered by engine 15. Such a pump already exists in the form of a power steering pump, which can then be deployed to keep accumulator 20 charged up to supply energy during an idle stop. Other moving components driven by engine 15 can also be deployed to power a pump supplying accumulator 20, and regenerative braking can be harnessed via a hydraulic pump to charge up accumulator 20.

Hydraulic accumulator 20 requires only a small amount of pressurized fluid to accomplish tasks that facilitate the idle stop system. One such task is restarting the engine, which can be done with a hydraulic starter motor 21, rather than the vehicle's electric starter motor 14. Such a hydraulic starter motor can be connected in a driving relationship to an engine to accomplish the restart. Another task for hydraulic accumulator 20 is to power air conditioner compressor 22 during an idle stop so that air conditioning will be available within the vehicle while the engine is stopped. Fans that distribute conditioned air within the vehicle can operate from the vehicle battery during an idle stop. If an idle stop proved to be much longer than expected, it might become necessary to restart the engine, but this possibility is readily available under the driver's control, simply by countermanding the signal that initiated the idle stop.

Figure 2:
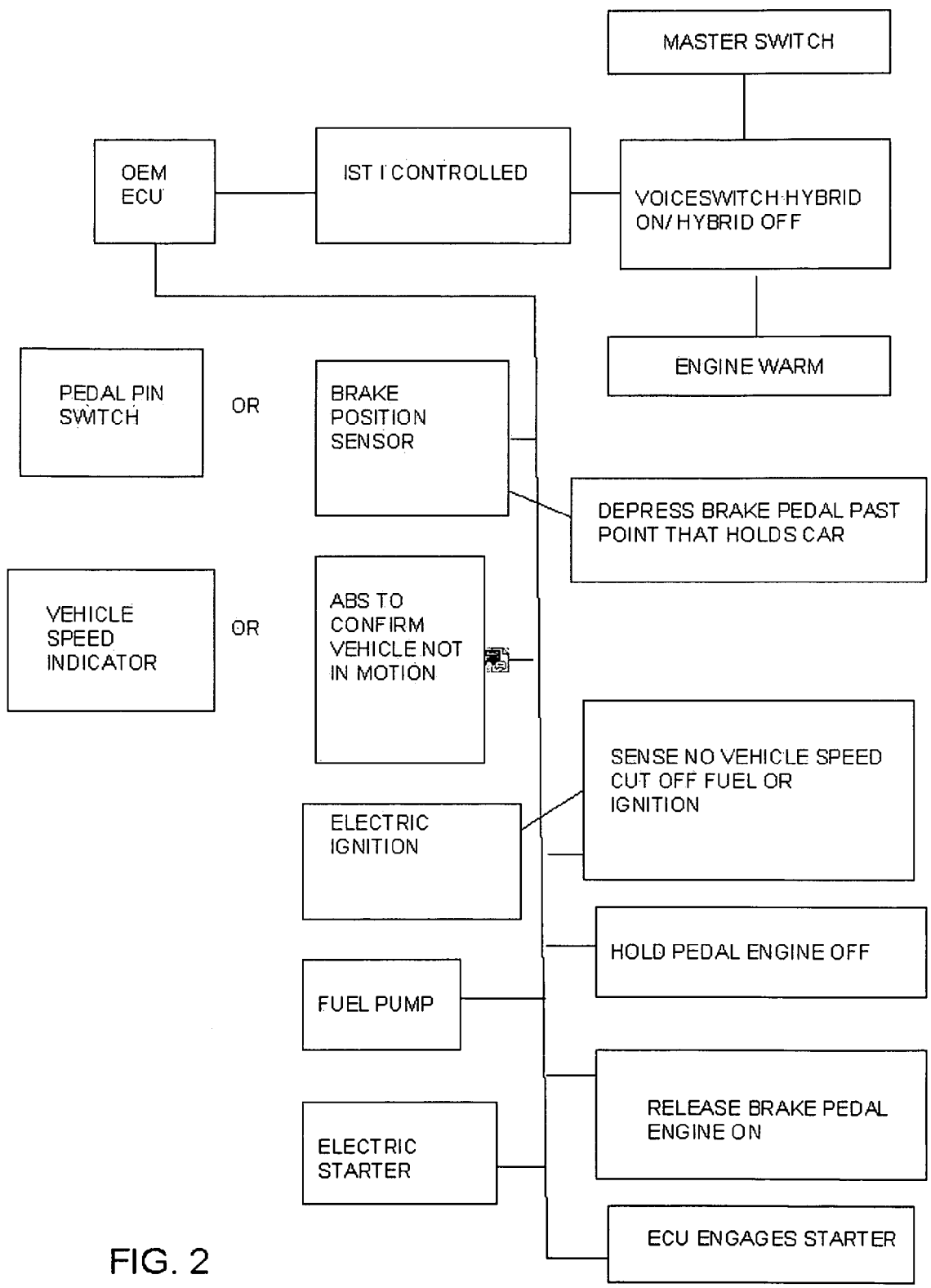
FIGS. 2-4 are schematic diagrams of three alternative variations of idle stop systems according to the invention.

FIG. 2 includes a few more details that can be preferred for an idle stop system. These include an on/off master switch, and the possibility that a voice activated switch can be used to turn an idle stop system on or off. A voice activated switch can also be substituted for brake pedal switching or hand brake switching to stop and start an engine to prevent unnecessary idling.

The FIG. 2 proposal also includes a vehicle speed indicator or a sensor and switch of some sort to show that the vehicle is not moving when the idle stop is actuated. It also includes a switch that de-activates the idle stop until an engine temperature exceeds 160° F.

Figure 3:
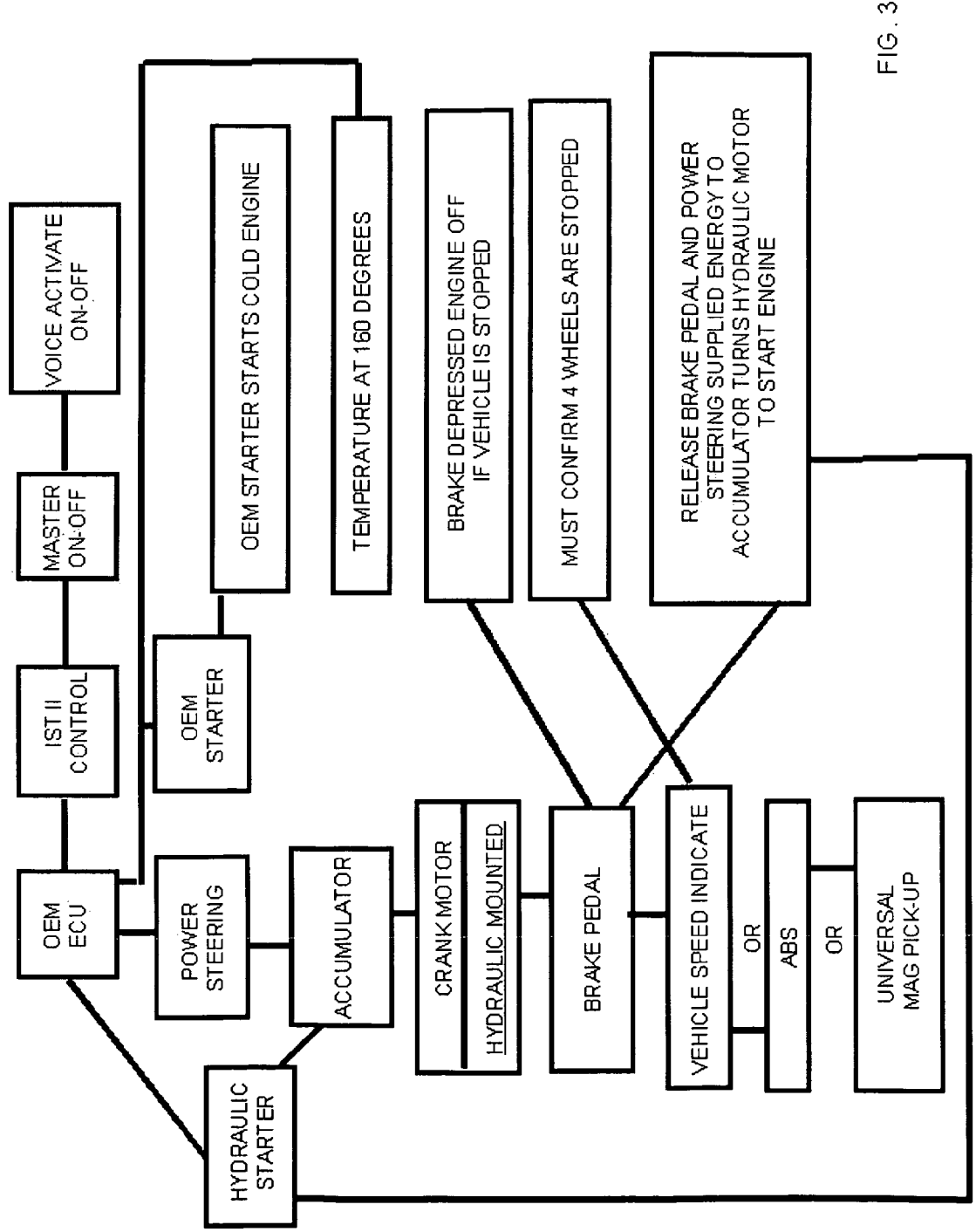

The FIG. 3 alternative points out that sensors must accurately determine that a vehicle is motionless before actuating an idle stop, so as to distinguish from wheels that are stopped while a vehicle skids. A magnetic pick-up at a universal joint may accomplish this.

The FIG. 3 alternative also includes a hydraulic accumulator, preferably powered by a power steering pump. Such an accumulator can operate a hydraulic starter.

Figure 4:
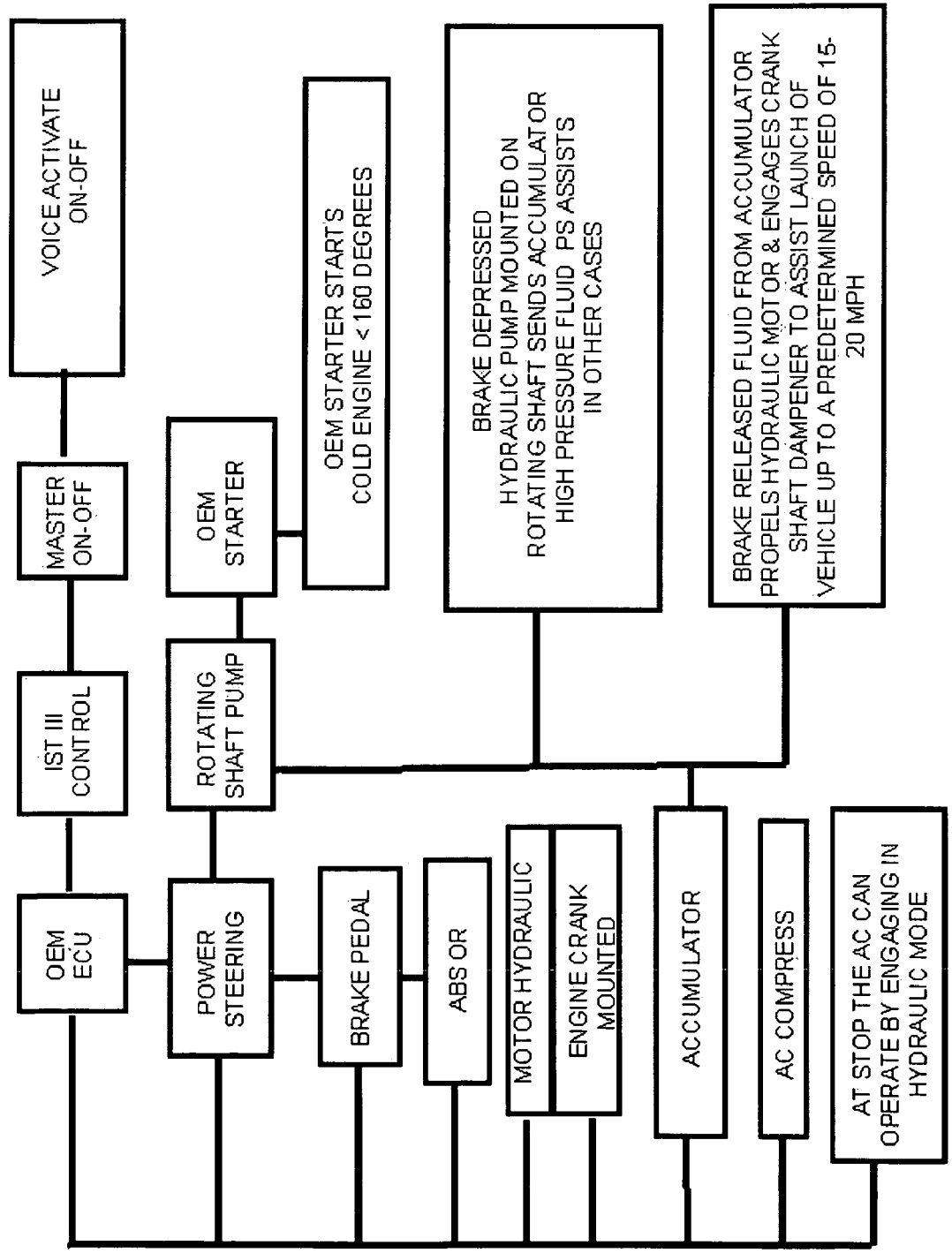

The embodiment of FIG. 4 adds an air conditioning compressor operated by a hydraulic accumulator during an idle stop. The hydraulic accumulator can be powered by a pump turned by a rotating shaft deriving power from the engine before an idle stop occurs. Fluid from the accumulator can then drive a hydraulic motor to restart the engine in response to an operator signal.

Other variations of preferred idle stop systems can use different combinations of the components illustrated in FIGS. 1-4. Also, substitutes for some of the components are available, and can be used in variations of idle stop systems. A goal of any such variations would be to achieve a simple, reliable, durable, and economic way of implementing an idle stop to conserve energy.

An alternative way of actuating an idle stop is especially suitable for delivery vehicles that stop for brief intervals while a delivery is made. These can actuate the idle stop by setting a hand brake or parking brake, and can automatically restart the engine by releasing the parking brake. Many delivery vehicles now leave an engine idling during a brief delivery stop in which the hand brake is set. An automatic idle stop and restart can be accomplished for such vehicles by using the parking brake to initiate a stop and a restart and thereby save fuel that would otherwise be wasted during unnecessary idling.

Another alternative for restarting an engine after an idle stop is to deliver a spark to an engine cylinder that is stopped in a power stroke position, as shown schematically in FIG. 7. After a brief idle stop, such an engine cylinder contains compressed fuel that can be ignited with a spark to start the engine running, providing that the engine's ignition and fuel supply are also operating. For this way of restarting an idle stopped engine, the crank case angle information that is stored by the vehicle computer when the engine stopped can be used to determine which cylinder is in a power stroke position so that a spark directed to that cylinder can start the crank shaft revolving and thereby restart the engine. Another possibility is to send sparks to all the cylinders, providing that no cylinder has stopped in a power stroke position short of top dead center. Sparks would be ineffective to cylinders that are not in a power stroke position, and would ignite a charge in a cylinder that is in a power stroke position, to set the engine moving again. A spark to a cylinder in a power stroke position in which its piston is short of top dead center should be avoided though, to prevent any reverse rotation of the engine. Crank shaft angle is something normally monitored by a vehicle computer and is available to ensure that sparks are directed only where suitable to restart an engine rotating in a forward direction.

Another alternative way of restarting an engine is to use a generator motor added to the engine in addition to the starter motor, as shown schematically in FIG. 8. Many repeated engine starts accomplished by a conventional starter motor may exceed the durability capacity of the starter motor. A separate motor made durable enough to accomplish many engine restartings without failure can avoid premature starter motor failure.

A preferred way of accomplishing this is with a motor generator belted to the engine so that the motor is available for starting the engine via a belt. Such a motor can also generate electricity, if desirable, while the engine is running and can also be belted to operate the air conditioner while the engine is idle stopped.

The additional generating capacity of an add-on motor generator can be stored in an enlarged capacity battery so that the motor generator can not only restart an idle stopped engine, but can also help move the vehicle after the engine restarts. This can be accomplished by having the vehicle computer signal the motor generator to apply a power assist via the engine belt to help turn the engine in a forward rotation while the vehicle is moving from a stand-still up to a small rate of speed to be determined. In effect this would use some of the electrical power stored by the battery and created by the motor generator to help the engine get the vehicle moving after a stop. In addition to providing a separate and more robust motor generator, this can also produce a hybrid effect creating a propulsion advantage as the vehicle gets moving. The benefits of this would be especially noticeable in urban driving conditions.

Many of the alternatives above are illustrated schematically in FIG. 9. This shows the several ways of initiating an idle stop and initiating an engine restart. It also includes vehicle condition sensors necessary for implementation of idle stops and restarts, including a stopped vehicle sensor, an engine temperature sensor, and a sensor verifying that the driver's seat is occupied. It also includes several of the preferred alternative ways of implementing an idle stop by killing an ignition or stopping fuel flow. Engine restarting alternatives are even more numerous. These include several ways of applying the starter motor to the engine while restoring an ignition system or fuel flow. The alternatives provide many different ways of implementing the invention to accomplish a simple and nearly automatic idle stop and engine restart to save fuel.

I claim:

1. An idle stop system for a motor vehicle having an onboard computer, the idle stop system comprising:
   components added to the vehicle to communicate with the onboard computer;
   the added components being arranged to respond to a driver idle stop request by implementing an idle stop when the vehicle is stopped and the engine is warm;
   the added components being arranged to implement the idle stop by killing an engine ignition system or stopping flow of fuel to the engine;
   the added components being arranged to respond to a driver restart request by restarting the engine whenever a driver's seat is occupied;
   the added components accomplishing the engine restart by operating a starter motor while turning on the engine ignition system or by operating a starter motor while re-establishing flow of fuel to the engine.

2. The idle stop system of claim 1 wherein the driver idle stop request is made by pressure on a foot brake, or setting a hand brake, or operating a voice-actuated switch.

3. The idle stop system of claim 1 wherein a driver restart request is made by releasing foot brake pressure or releasing a hand brake or operating a voice-actuated switch.

4. The idle stop system of claim 1 wherein the added components arranged to implement an engine restart comprise a starter motor powered by a hydraulic accumulator.

5. The idle stop system of claim 1 wherein the added components arranged to implement an engine restart comprise a motor generator electrically connected to a battery and rotationally connected to the engine.

6. The idle stop system of claim 5 wherein the added components are arranged to assist the engine in accelerating the vehicle into movement.

7. The idle stop system of claim 1 wherein the added components include a hydraulic accumulator powering a hydraulic motor to operate an air conditioner compressor during an idle stop.

8. An idle stop system comprising
   an idle stop controller added to a motor vehicle having a computer so that the idle stop controller communicates with the vehicle computer;
   the idle stop controller cooperating with the vehicle computer to respond to a driver signal to initiate an idle stop whenever the vehicle is motionless and the engine is warm;
   the idle stop controller cooperating with the vehicle computer to implement an idle stop by killing an engine ignition system or stopping flow of fuel to the engine;
   the idle stop controller cooperating with the engine computer to respond to a driver signal to restart the engine whenever a driver's seat is occupied; and
   the idle stop controller cooperating with the engine computer to restart the engine by actuating a starter motor while turning on the engine ignition or restoring flow of fuel to the engine.

9. The idle stop system of claim 8 wherein the driver signal to initiate an idle stop comprises foot brake pressure, or hand brake setting, or operation of a voice-actuated switch.

10. The idle stop system of claim 8 wherein the driver's signal to restart the engine comprises release of foot brake pressure or release of a hand brake or operation of a voice actuated switch.

11. The idle stop system of claim 8 including a hydraulic accumulator arranged to operate a compressor motor for a vehicle air conditioning system during an idle stop.

12. The idle stop system of claim 8 including a motor generator rotationally connected to the engine and electrically connected to a battery, the motor generator being arranged for restarting the engine after an idle stop and for using battery power to assist the engine in moving the vehicle after an idle stop.

* * * * *